(12) United States Patent
Schulz et al.

(10) Patent No.: US 10,717,911 B2
(45) Date of Patent: Jul. 21, 2020

(54) ELECTRICALLY CONDUCTING THERMALLY CONDUCTIVE POLYMER RESIN COMPOSITION BASED ON STYRENICS WITH BALANCED PROPERTIES

(71) Applicant: INEOS STYROLUTION GROUP GMBH, Frankfurt am Main (DE)

(72) Inventors: Tobias Schulz, Cologne (DE); Janna Michaelis De Vasconcellos, Sprockhoevel (DE); Gisbert Michels, Leverkusen (DE); Norbert Niessner, Friedelsheim (DE); Hans-Werner Schmidt, Bayreuth (DE); Florian Wieberger, Bamberg (DE); Tristan Kolb, Bayreuth (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 173 days.

(21) Appl. No.: 15/765,780

(22) PCT Filed: Oct. 6, 2016

(86) PCT No.: PCT/EP2016/073864
§ 371 (c)(1),
(2) Date: Apr. 4, 2018

(87) PCT Pub. No.: WO2017/060343
PCT Pub. Date: Apr. 13, 2017

(65) Prior Publication Data
US 2018/0282604 A1    Oct. 4, 2018

(30) Foreign Application Priority Data

Oct. 9, 2015  (EP) .................................. 15189138

(51) Int. Cl.
| | | |
|---|---|---|
| *C09K 5/14* | (2006.01) |
| *C08K 3/04* | (2006.01) |
| *C08K 3/34* | (2006.01) |
| *C08K 3/38* | (2006.01) |
| *C08K 3/18* | (2006.01) |
| *B29B 7/90* | (2006.01) |
| *B29C 45/00* | (2006.01) |
| *C08F 293/00* | (2006.01) |
| *B29K 9/06* | (2006.01) |
| *B82Y 30/00* | (2011.01) |

(52) U.S. Cl.
CPC .................. *C09K 5/14* (2013.01); *B29B 7/90* (2013.01); *B29C 45/0001* (2013.01); *C08F 293/00* (2013.01); *C08K 3/04* (2013.01); *C08K 3/041* (2017.05); *C08K 3/18* (2013.01); *C08K 3/34* (2013.01); *C08K 3/38* (2013.01); *B29K 2009/06* (2013.01); *B29K 2995/0013* (2013.01); *B82Y 30/00* (2013.01); *C08K 2003/385* (2013.01); *C08K 2201/001* (2013.01); *C08K 2201/011* (2013.01); *Y10S 977/752* (2013.01); *Y10S 977/753* (2013.01)

(58) Field of Classification Search
CPC . C08K 3/18; C08K 3/041; C08K 3/38; C08K 3/34; C08K 3/04; C09K 5/14; B29B 7/90
See application file for complete search history.

(56) References Cited

U.S. PATENT DOCUMENTS

| | | |
|---|---|---|
| 3,553,167 A | 1/1971 | Schnell et al. |
| 4,075,173 A | 2/1978 | Maruyama et al. |
| 4,156,069 A | 5/1979 | Prevorsek et al. |
| 4,311,823 A | 1/1982 | Imai et al. |
| 4,334,053 A | 6/1982 | Freitag et al. |
| 4,982,014 A | 1/1991 | Freitag et al. |
| 5,197,889 A | 3/1993 | Rizzo et al. |
| 5,760,134 A | 6/1998 | Guntherberg et al. |
| 6,579,937 B1 | 6/2003 | Guntherberg et al. |
| 7,923,615 B2 | 4/2011 | Silvy et al. |
| 2002/0058743 A1 | 5/2002 | Tobita et al. |

(Continued)

FOREIGN PATENT DOCUMENTS

| | | |
|---|---|---|
| CA | 1173998 A | 9/1984 |
| DE | 1495626 B1 | 6/1971 |
| DE | 2232877 A1 | 1/1974 |
| DE | 2703376 A1 | 8/1977 |
| DE | 2714544 A1 | 10/1977 |
| DE | 3000610 A1 | 7/1980 |
| DE | 2940024 A1 | 4/1981 |
| DE | 3007934 A1 | 9/1981 |
| DE | 3832396 A1 | 2/1990 |
| EP | 1893528 B1 | 9/2011 |
| EP | 2537895 A1 | 12/2012 |
| JP | 2015019085 A | 1/2015 |
| KR | 20090001068 A | 1/2009 |
| KR | 20100061082 A | 6/2010 |
| KR | 20130088251 A | 8/2013 |
| WO | 2014/202649 A1 | 12/2014 |

OTHER PUBLICATIONS

International Preliminary Report on Patentability in International Application No. PCT/EP2016/073864, dated Sep. 27, 2017.

*Primary Examiner* — Peter D. Mulcahy
(74) *Attorney, Agent, or Firm* — J.A. Lindeman & Co. PLLC

(57) ABSTRACT

Thermally conductive polymer (TCP) resin compositions are described, comprising: 50 to 75% matrix polymer (I) comprising styrenic polymers (I') such as ABS (acrylonitrile-butadiene-styrene) resins, ASA (acrylonitrile-styrene-acrylate) resins and elastomeric block copolymers of the structure $(S-(B/S))_n$-S; and 25 to 50% thermally conductive filler material (II) ($D_{50}$ 0.1 to 200 μm), consisting of carbonyl iron powder (1l-1) in mixture with multi wall carbon nanotubes, silicon carbide, diamond, graphite, aluminosilicates and/or boron nitride (II-2); wherein the volume ratio of (1l-1)/(1l-2) is 15:1 to 0.1:1. Shaped articles made thereof can be used for materials with antistatic finish, electrical and electronic housings, toys and helmet inlays.

11 Claims, No Drawings

(56) References Cited

U.S. PATENT DOCUMENTS

| | | |
|---|---|---|
| 2008/0153959 A1 | 6/2008 | Charati et al. |
| 2008/0277619 A1 | 11/2008 | Matsumoto et al. |
| 2009/0114440 A1* | 5/2009 | Yamamoto ............... H01F 1/26 174/391 |
| 2012/0157600 A1 | 6/2012 | Saga |
| 2014/0080954 A1 | 3/2014 | Raman et al. |
| 2014/0240989 A1 | 8/2014 | Hardikar et al. |

* cited by examiner

ELECTRICALLY CONDUCTING THERMALLY CONDUCTIVE POLYMER RESIN COMPOSITION BASED ON STYRENICS WITH BALANCED PROPERTIES

The present invention deals with a thermoplastic polymer resin composition with high thermal conductivity and medium melt flow suitable for injection molding and extrusion, and low electrical resistivity to facilitate dissipation of electrical charges. The thermally conductive polymer (TCP) resin composition comprises a matrix polymer based on styrenic polymers (styrenics), in particular styrene copolymers. Further aspects of the invention are a process for the preparation of the TCP resin composition, shaped articles comprising the TCP-composition and the use of shaped articles comprising the TCP-composition for several applications such as: materials with antistatic finish, electrical and electronic housings, toys and helmet inlays.

Because of their excellent mechanical properties, thermoplastic polymeric resin compositions are used to manufacture articles of various sizes and shapes, including without limitation chassis components, and housings. In many cases, because of the de-sign flexibility and their low cost, polymer resin compositions have replaced metal in these applications. However, many of these applications require that the parts be in the vicinity of or in contact with heat sources such as electrical lights. It is therefore desirable to form these parts from materials that are sufficiently thermally conductive to dissipate the heat generated. In an attempt to improve thermal conductive characteristics, it has been a conventional practice to add thermally conductive materials to thermoplastic compositions.

WO 2014/202649 discloses thermally conductive polymer/boron nitride compounds which comprise a thermoplastic polymer, boron nitride agglomerate, a reinforcing filler and optionally at least one further thermally conductive filler selected from powdered metal, carbon in the form of graphite, and ceramic fillers and mineral fillers. As thermoplastic polymer polyamide is preferably used, thermoplastic polymers made from vinylaromatic monomers are not explicitly mentioned. A combination of polyamide 6, boron nitride hybride flakes, aluminosilicate and glass fibers is most preferred.

KR-A-20100061082 discloses a thermally conductive polymer composition comprising 56-64 vol.-% ceramic filler particles and 0.9-1 vol.-% multi-walled carbon nanotube particles, each based on the volume of the polymer resin. The polymer resin having a low viscosity is an epoxy-, phenol- or polyvinylidene fluoride resin.

US 2012/0157600 describes a molded thermoplastic article comprising a thermoplastic polymer, a thermally conductive filler and carbon black powder.

As thermally conductive fillers a variety of flakes and fibers composed of oxides, nitrides, metals and carbon is mentioned, graphite being in particular preferable. Among the suitable thermoplastic polymers syndiotactic polystyrene is listed, but polyesters and polyamides are preferred. The composition is used for motor housings, lamp housings and electrical and electronical housings.

KR-A-20130088251 deals with a thermally conductive material comprising a thermoplastic resin selected from polyolefins, polyamides, polybutyleneterephthalates, acrylonitrile-butadiene-styrene copolymers, polycarbonates, polyesters, polyphenylenesulfides and thermoplastic elastomers, and graphite and/or bonding nitrogen as thermoplastic conductive filler. Preferably as thermoplastic resins PP, PA6 or PBT are used in combination with expanded graphite or bonding nitrogen, optionally in combination with low amounts of carbon multi wall nanotubes.

KR-A-20090001068 discloses a thermally conductive thermoplastic resin composition comprising 100.0 parts by weight of a base resin and 0.1-30 parts by weight of a thermal conductive additive. The base resin comprises a grafted acrylonitrile-styrene-butadiene (ABS) copolymer resin (A) and a styrene-acrylonitrile (SAN) copolymer (B). The thermally conductive additive is a low melting point metal, a ceramic fiber, in particular alumina fiber, or their mixture.

US 2002/0058743 discloses a thermally conductive polymer composition comprising a polymer matrix, preferably made from a thermoplastic resin or thermoplastic elastomer, and graphitized carbon fibers and optionally a thermally conductive filler that is electrically insulative (e.g. BN, natural graphite, SiC). In a long list of suitable resins inter alia styrene acrylonitrile copolymer, ABS resin, and styrene-butadiene block copolymers are listed. One composition contains a styrene thermoplastic elastomer, graphitized carbon fibers, boron nitride and aluminum hydroxide.

US 2014/0240989 describes thermally conductive polymers comprising a thermoplastic polymer and a thermally conductive material such as AlN, BN, $MgSiN_2$, SiC and/or graphite. In a long list of suitable polymers inter alia polystyrenes and ABS and blends of ABS are mentioned, polyamides are in particular preferred.

The afore-mentioned currently available thermally conductive thermoplastic resin compositions are often difficult to process in particular by injection molding due to high shrinkage, often show minor surface quality (high roughness) and low surface gloss Furthermore their antistatic properties are often not satisfying.

Thus, there is still a need for thermally conductive materials with a high thermal conductivity and sufficient electrical conductivity to dissipate surface charges, which are suitable for injection molding, possessing balanced properties with respect to shrinkage, surface gloss, antistatic properties and processability. Therefore, it is an object of the invention to provide a thermally conductive polymer resin composition having the afore-mentioned properties.

It was surprisingly found that the problem mentioned above can be solved by the TCP resin composition according to the claims.

One aspect of the invention is a thermally conductive polymer (TCP) resin composition comprising (or consisting of) components (I) and (II):

(I) 50 to 75%, preferably 57 to 70%, more preferred 60 to 69% by volume of at least one matrix polymer (I) as component (I) comprising styrenic polymers (I') selected from the group consisting of: ABS (acrylonitrile-butadiene-styrene) resins, ASA (acrylonitrile-styrene-acrylate) resins, and elastomeric block copolymers of the structure $(S-(B/S))_n-S$, where S is a vinylaromatic block forming a hard phase, (B/S) is a random copolymer block of vinylaromatic monomer and of a conjugated diene forming a soft phase, and n are natural numbers from 1 to 10, wherein the elastomeric block copolymer has a monomer composition comprising 25 to 60% by weight (based on the elastomeric block copolymer) of diene and 75 to 40% by weight (based on the elastomeric block copolymer) of vinylaromatic compound, the glass transition temperature Tg of block S is above 25° C. and that of block (B/S) is below 25° C., and the proportion of the hard phase in the elastomeric block copolymer is from 5 to 40% by weight and the relative amount of 1,2 linkages of the polydiene, based on the sum of 1,2- and 1,4-cis/trans-linkages, is less than 15%;

(II) 25 to 50%, preferably 30 to 43%, more preferred 31 to 40% by volume of a thermally conductive filler material (II) having a weight median particle diameter ($D_{50}$) of from 0.1 to 200 μm, which consists of carbonyl iron powder as component (II-1) in mixture with at least one component (II-2) selected from the group consisting of: multi wall carbon nanotubes, silicon carbide, diamond, graphite, aluminosilicates and boron nitride, wherein the volume ratio between components (II-1) and (II-2) is from 15:1 to 0.1:1, preferably 10:1 to 0.5:1, more preferred 7:1 to 1:1, most preferred 5:1 to 2:1;

and wherein the sum of components (I) and (II) totals 100% by volume.

In a cumulative particle size distribution the ordinate represents the cumulative size distribution from 0% to 100% and the abscissa represents the particle size. The particle size corresponding to an ordinate value of 50% is called $D_{50}$. The weight median particle size $D_{50}$ is the diameter which divides the population exactly into two equal parts. 50% by weight of the particles are larger than the median particle size $D_{50}$ and 50% by weight are smaller.

The particle sizes of component (II) can be measured using mesh analysis (e.g. Retsch AS 200 jet), Transmission Electron Microscopy (TEM), dynamic image analysis (e.g. Retsch Camsizer XT) and/or laser light scattering (e.g. Horiba LA-300).

In principle, the inventive TCP resin composition can optionally comprise at least one further common additive and/or auxiliary as component (III). Component (III) is, if present, different from components (I) and (II). Said additives and/or auxiliaries (III) may be present in the inventive polymer blend in low amounts, such as 0.1 to 5% by weight, preferably 0.1 to 3% by weight, based on the entire inventive TCP resin composition. Suitable further additives and/or auxiliaries (III) are such as common plastic processing aids, plasticizers, waxes, antioxidants, mineral oil, silicone oil, heat- and/or UV-stabilizers, flame-retardants, dyes and pigments, in particular plastic processing aids such as antioxidant agents and lubricants. Preferably the afore-mentioned inventive TCP resin composition does not comprise further additives and/or auxiliaries (III).

The inventive TCP resin composition generally has a thermal conductivity κ of more than 0.5 W/m·K, preferably more than 0.7 W/m·K, more preferred more than 0.9 W/m·K, most preferred more than 1.0 W/m·K.

The thermal conductivity is defined as $\kappa = \alpha \cdot c_p \cdot \rho$ and is determined as follows:

thermal diffusivity α: determined by Laser flash analysis (XFA 500 XenonFlash apparatus (Linseis) with an InSb infrared detector)

specific heat $c_p$ is determined by DSC (TA Instruments Q1000 DSC), ASTM E1269 density ρ is determined by Buoyancy Balance (Mettler Toledo AG245)

Further the shrinkage usually is less than 7%, preferably less than 3%, more preferred less than 1% (determined from the density difference of solid material and corresponding melt).

Furthermore, the TCP resin composition has anti-static properties, the bulk resistivity, determined according to DIN EN ISO 3915 (1999-10), usually is from:

$10^{-2}$ to $10^8$ Ohm*m, preferably from $10^{-1}$ to $10^6$ Ohm*m, more preferred from 1 to $10^4$ Ohm*m, most preferred from 2 to $10^2$ Ohm*m.

Unless otherwise stated, all cited standards for any measurement method refer to the current issue of the cited standard valid at the priority date.

Component (I)

Suitable components (I) or matrix polymers (I) comprise (consist of) at least one styrenic polymer (I') selected from the group consisting of: ABS (acrylonitrile-butadiene-styrene) resins, ASA (acrylonitrile-styrene-acrylate) resins, and the above-mentioned elastomeric block copolymers of the structure $(S-(B/S))_n-S$.

Additionally the matrix polymer (I) can optionally comprise (consist of) at least one further thermoplastic polymer (I") selected from the group consisting of: polycarbonates and polyamides.

Preferably the matrix polymer (I) comprises or consists of one styrenic polymer (I') optionally in a mixture with one of said further thermoplastic polymers (I").

If the matrix polymer (I) comprises a further thermoplastic polymer (I"), the styrenic polymer (I') is preferably an ABS resin or ASA resin.

More preferred the matrix polymer (I) comprises (or consists of) at least one—preferably exactly one—: ABS resin, ASA resin, elastomeric block copolymer of the structure $(A-(B/A))_n-A$, blend of ABS resin with polycarbonate (PC), blend of ABS resin with polyamide (PA), blend of ASA resin with polycarbonate (PC), or blend of ASA resin with polyamide (PA).

The afore-mentioned term "blend" means a mixture of one or more, preferably one, of the styrenic polymers (I') and one or more, preferably one, of the further thermoplastic polymers (I"). The blend may be obtained by combining said polymers (I') and (I") using any melt-mixing method. Preferably said polymers (I') and (I") are used as a ready mix blend of the matrix polymer (I) which may then be used for the manufacture of the inventive TCP resin composition. Alternatively for the manufacture of the inventive TCP resin composition said polymers (I') and (I") can be used individually and may be added simultaneously or successively to a compounder to form a melt-mixed blend of the matrix polymer (I).

According to a first preferred embodiment the matrix polymer (I) is an ABS resin.

According to a second preferred embodiment the matrix polymer (I) is an ASA resin.

According to a third preferred embodiment the matrix polymer (I) is an elastomeric block copolymer of the structure $(A-(B/A))_n-A$.

According to a fourth preferred embodiment the matrix polymer (I) is a blend of an ABS resin with polycarbonate.

According to a fifth preferred embodiment the matrix polymer (I) is a blend of an ABS resin with polyamide.

According to a sixth preferred embodiment the matrix polymer (I) is a blend of an ASA resin with polycarbonate.

According to a seventh preferred embodiment the matrix polymer (I) is a blend of an ASA resin with polyamide.

The afore-mentioned matrix polymers (I) are commonly known to a person skilled in the art and are commercially available. Typical examples of suitable commercially available products are such as Terluran® GP22 (ABS); Terluran HI-10 (ABS); Luran® S 797 (ASA); Luran S 778T (ASA); Luran S 757 (ASA); Terblend® N NM-21 EF (ABS/PA); Terblend S NM-31 (ASA/PA); Luran S KR2864C (ASA/PC), Novodur® P2H-AT (ABS), Novodur Ultra (ABS/PC)

and Styroflex® 2G66 (styrenic block copolymer (SBC)), all of which are obtainable from Styrolution company (Frankfurt, Germany).

Among the afore-mentioned products Terluran® GP22, Terluran® HI-10 Terblend® N NM-21 EF and/or Styroflex® 2G66 is preferably used as matrix polymer (I). More preferred as matrix polymer (I) is Terluran® HI-10, Terblend® N NM-21 EF and/or Styroflex® 2G66. Each of the afore-mentioned products can be used in mixture with each other or, preferably, alone.

Suitable ABS resins used as styrenic polymer (I') comprise at least one, preferably one, graft copolymer (I'-1) of a diene-based rubber and at least one, preferably one, rubber free vinyl copolymer (I'-2).

The graft copolymer (I'-1) is based on a diene-rubber, in particular a butadiene rubber, upon which a mixture of at least one vinylaromatic monomer, in particular styrene, and acrylonitrile and optionally further monoethylenically unsaturated monomers is grafted.

The rubber free vinyl copolymer (I'-2) is in particular a copolymer made from at least one, preferably one vinylaromatic monomer such as styrene or alpha methyl styrene, and acrylonitrile and optionally an additional monoethylenically unsaturated monomer.

The rubber free copolymer (I'-2) is preferably a copolymer made from styrene and acrylonitrile (SAN-copolymer) or a copolymer made from alpha methyl styrene and acrylonitrile (AMSAN-copolymer).

The graft copolymer (I'-1) is usually embedded in a matrix made from the rubber free vinyl copolymer (I'-2).

An ABS resin (I') comprising (or consisting of) an ABS graft copolymer (I'-1) and a styrene-acrylonitrile (SAN) copolymer (I'-2) is preferred. Such an ABS resin (I') is commercially available e.g. from Styrolution company as Terluran® GP22 (ABS) and Terluran HI-10 (ABS).

Preferred SAN-copolymers or AMSAN-copolymers (1'-2) comprise (consist of) generally 18 to 35 wt.-%, preferably 20 to 32 wt.-%, particular preferably 22 to 30 wt.-% acrylonitrile (AN), and 82 to 65 wt.-%, preferably 80 to 68 wt.-%, particular preferably 78 to 70 wt.-% styrene (S) or alpha methyl styrene (AMS), wherein the sum of the amounts of styrene or alpha methyl styrene and acrylonitrile totals 100 wt.-%.

Said SAN copolymers (I'-2) are also known and commercially available as for example Luran® 358 N (VLM); Luran 251000, Luran 2580 from Styrolution company.

Said AMSAN copolymers (I'-2) are commercially available as for example Luran HH-120 from Styrolution company.

According to the invention ABS resins (I') as herein before and hereinafter described are preferred which comprise (consist of) from 5 to 80%, preferably from 15 to 60%, more preferred from 35 to 55%, most preferred 40 to 50% by weight, based on the total of components (I') by weight of a graft polymer (I'-1) and from 20 to 95%, preferably from 40 to 85%, more preferred from 45 to 65%, most preferred 50 to 60% by weight by weight of a rubber free vinyl copolymer (I'-2).

In particular preferred is an ABS resin (I') comprising components (I'-1) and (I'-2),
(I'-1) from 5 to 80% by weight, based on (I'), of a graft polymer (I'-1) having monomodal or, preferred, bimodal particle size distribution made from,
a1) 40 to 90% by weight of an elastomeric particulate graft base a1), obtained by polymerization of, based on a1),
  a11) from 70 to 100% by weight of at least one conjugated diene, in particular butadiene,
  a12) from 0 to 30% by weight of at least one other monoethylenically unsaturated monomer and
  a13) from 0 to 10% by weight of at least one polyfunctional, crosslinking monomer and
a2) from 10 to 60% by weight of a graft a2) made from, based on a2),
  a21) from 65 to 95% by weight of at least one vinylaromatic monomer, in particular styrene,
  a22) from 5 to 35% by weight of acrylonitrile,
  a23) from 0 to 30% by weight of at least one other monoethylenically unsaturated monomer, and
  a24) from 0 to 10% by weight of at least one polyfunctional, crosslinking monomer and
(I'-2) from 20 to 95% by weight of a rubber free vinyl copolymer (I'-2) having a viscosity number VN (determined according to DIN 53726 at 25° C., 0.5% by weight in dimethyl-formamide) of from 50 to 120 ml/g, made from, based on (1'-2),
  a21) from 69 to 81% by weight of at least one vinylaromatic monomer, in particular styrene,
  a22) from 19 to 31% by weight of acrylonitrile, and
  a23) from 0 to 12% by weight of at least one other monoethylenically unsaturated monomer.

Such preferred ABS resins are described in U.S. Pat. No. 6,323,279.

Graft copolymers (I'-1) can be prepared by known polymerization techniques, such as solution or bulk polymerization or emulsion polymerization.

A suitable process for the preparation of graft copolymers (I'-1) by emulsion polymerization is disclosed in detail in U.S. Pat. No. 6,323,279. Furthermore it is referred to U.S. Pat. No. 5,434,218 which discloses a suitable process for the preparation of graft copolymers (I'-1) whose rubber phases are prepared exclusively by solution or bulk polymerization.

The graft copolymer (I'-1) is then mixed with the rubber free vinyl copolymer (I'-2) by usual methods.

The mixing apparatuses used are those known to the person skilled in the art. Components (I'-1) and (I'-2) may be mixed, for example, by extruding, kneading or rolling them together.

Suitable ASA resins used as styrenic polymer (I') comprise at least one, preferably one, graft copolymer (I'-3) of an acrylate-based rubber and at least one, preferably one rubber free vinyl copolymer (I'-2) as defined above.

The graft copolymer (I'-3) is based on an acrylate rubber, in particular a butyl acrylate rubber, upon which a mixture of at least one vinylaromatic monomer, in particular styrene, and acrylonitrile and optionally further monoethylenically unsaturated monomers is grafted.

The graft copolymer (1'-3) is usually embedded in a matrix made from the rubber free vinyl copolymer (1'-2).

An ASA resin (I'), comprising (consisting of) an ASA graft copolymer (1'-3) and a styrene-acrylonitrile (SAN) copolymer (1'-2) is very particular preferred and is commercially available e.g. from Styrolution company as Luran® S 797; Luran S 777 K and Luran S 757.

Furthermore preferred are ASA resins (I') comprising (consisting of) a graft copolymer (I'-3) and an alpha methyl styrene-acrylonitrile (AMSAN) copolymer (I'-2) which are commercially available e.g. from Styrolution company as Luran S 778 T.

Preferably the ASA resins (I') comprise (consist of) 29 to 46 wt.-% graft copolymer (I'-3) and 54 to 71 wt.-% rubber free vinyl copolymer (I'-2), wherein the sum of components (I'-3) and (I'-2) totals 100% by weight.

A preferred graft copolymer (I'-3) is built up from ($a_3$) 30 to 90% by weight, based on (I'-3), of a graft base ($a_3$) with a glass transition temperature ($T_g$) below −10° C. made from ($a_{31}$) an at least partially crosslinked acrylate polymer formed from ($a_{311}$) 50 to 99.9% by weight, based on ($a_{31}$), of at least one $C_1$-$C_{10}$-alkyl acrylate, in particular n-butylacrylate, ($a_{312}$) 0.1 to 5% by weight, based on ($a_{31}$), of at least one polyfunctional crosslinking monomer and ($a_{313}$) 0 to 49.9% by weight, based on ($a_{31}$), of a further monomer which is copolymerizable with ($a_{111}$) selected from the group consisting of the vinyl $C_1$-$C_8$-alkyl ethers, butadiene, isoprene, styrene, acrylonitrile and methacrylonitrile, and/or methyl methacrylate ($a_4$) from 10 to 70% by weight, based on (I'), of a graft ($a_4$) with a ($T_g$) above 50° C., grafted onto the graft base ($a_3$) and built up from ($a_{41}$) 50 to 95% by weight, based on ($a_4$), of at least one vinylaromatic monomer, in particular styrene, ($a_{42}$) 5 to 50% by weight, based on ($a_4$), of at least one polar, copolymerizable comonomer selected from the group consisting of acrylonitrile, methacrylonitrile, $C_1$-$C_4$-alkyl (meth)acrylates, maleic anhydride and maleimides, and (meth)acrylamide, and/or vinyl $C_1$-$C_8$-alkyl ethers, or a mixture of these, in particular acrylonitrile.

Preferably said graft copolymer (I'-3) is an ASA graft copolymer, made from an at least partially crosslinked n-butyl acrylate rubber upon which styrene and acrylonitrile are grafted.

Graft copolymers (I'-3) can be prepared by known polymerization techniques, such as solution or bulk polymerization or emulsion polymerization. Suitable graft copolymers (I'-3) and their preparation are disclosed in for example U.S. Pat. Nos. 5,760,134 and 6,579,937 to which is in particular referred.

Polycarbonates which are suitable for the afore-mentioned blends of ABS- or ASA-resins are described in EP-A 2537895 in paragraphs 22 to 32 to which is in particular referred. As polycarbonate one or more, preferably one or two, more preferred one aromatic polycarbonate can be used. According to the invention the term polycarbonate includes for example polycondensation products, for example aromatic polycarbonates, aromatic polyester carbonates.

Aromatic polycarbonates and/or aromatic polyester carbonates which are suitable according to the invention are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester carbonates e.g. DE-A 3 077 934). The preparation of aromatic polycarbonates is carried out e.g. by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is also possible.

Preferred diphenols for the preparation of the aromatic polycarbonates and/or aromatic polyester carbonates are hydroquinone, resorcinol, dihydroxydiphenols, bis-(hydroxyphenyl)-C1-C5-alkanes, bis-(hydroxyphenyl)-C5-C6-cycloalkanes, bis-(hydroxyphenyl)ethers, bis-(hydroxyphenyl)sulfoxides, bis-(hydroxyphenyl)ketones, bis-(hydroxyphenyl)sulfones and α,α-bis-(hydroxyphenyl)-diisopropyl-benzenes and nucleus-brominated and/or nucleus-chlorinated derivatives thereof. Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-bis-(4-hydroxyphenyl)-propane (bisphenol A) is particularly preferred. The diphenols may be employed individually or as any desired mixtures. The diphenols are known from the literature or obtainable by processes known from the literature.

The thermoplastic, aromatic polycarbonates have average weight-average molecular weights (MW, measured e.g. by ultracentrifuge or scattered light measurement) of from 10,000 to 200,000 g/mol, preferably 15,000 to 80,000 g/mol, particularly preferably 24,000 to 32,000 g/mol. The thermoplastic, aromatic polycarbonates may be branched in a known manner, and in particular preferably by incorporation of from 0.05 to 2.0 mol %, based on the sum of the diphenols employed, of compounds which are trifunctional or more than trifunctional, for example those having three and more phenolic groups. Both homopolycarbonates and copolycarbonates are suitable.

Preferred polycarbonates are, in addition to the bisphenol A homopolycarbonates, the copolycarbonates of bisphenol A with up to 15 mol %, based on the sum of the moles of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether-4,4'-dicarboxylic acid and of naphthalene-2,6-dicarboxylic acid. Mixtures of the diacid dichlorides of isophthalic acid and of terephthalic acid in a ratio of between 1:20 and 20:1 are particularly preferred. A carbonic acid halide, preferably phosgene, is additionally co-used as a bifunctional acid derivative in the preparation of polyester carbonates. The aromatic polyester carbonates may also contain incorporated aromatic hydroxycarboxylic acids. The aromatic polyester carbonates may be either linear or branched in a known manner (in this context see DE-A 2 940 024 and DE-A 3 007 934).

The relative solution viscosity (ηrel) of the aromatic polycarbonates and polyester carbonates is in the range of 1.18 to 1.4, preferably 1.20 to 1.32 (measured on solutions of 0.5 g polycarbonate or polyester carbonate in 100 ml methylene chloride solution at 25° C.). The thermoplastic, aromatic polycarbonates and polyester carbonates may be employed by themselves or in any desired mixture of one or more, preferably one to three or one or two thereof. Most preferably only one type of polycarbonate is used.

Most preferably the aromatic polycarbonate is a polycarbonate based on bisphenol A and phosgene, which includes polycarbonates that have been prepared from corresponding precursors or synthetic building blocks of bisphenol A and phosgene. These preferred aromatic polycarbonates may be linear or branched due to the presence of branching sites.

Polyamides which are suitable for the afore-mentioned blends of ABS- or ASA-resins are described in EP-A 2537895 in paragraphs 39 to 40 to which is in particular referred. Suitable polyamides are known homopolyamides, copolyamides and mixtures of such polyamides. They may be semi-crystalline and/or amorphous polyamides.

Suitable semi-crystalline polyamides are polyamide-6, polyamide-6,6, mixtures and corresponding copolymers of those components. Also included are semi-crystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or p-xylylene-diamine and/or hexamethylenediamine and/or 2,2,4-trimethylhexamethylenediamine and/or 2,2,4-trimethylhexamethylenediamine and/or isophoronediamine, and the composition of which is in principle known. Mention may also be made of polyamides that are prepared wholly or partially from lactams having from 7 to 12 carbon atoms in the ring, optionally with the concomitant use of one or more of the above-mentioned starting components. Particularly preferred semi-crystalline polyamides are polyamide-6 and polyamide-6,6 and mixtures thereof.

Known products may be used as amorphous polyamides. They are obtained by polycondensation of diamines, such as ethylenediamine, hexamethylenediamine, deca-methylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of a plurality of monomers, as well as copolymers prepared with the addition of aminocarboxylic acids such as ε-aminocaproic acid, ω-aminoundecanoic acid or ω-aminolauric acid or their lactams.

Particularly suitable amorphous polyamides are the polyamides prepared from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diaminodicyclohexylmethane and ε-caprolactam; or from isophthalic acid, 3,3'-dimethyl-4,4'-diaminodicyclohexylmethane and laurinlactam; or from terephthalic acid and the isomeric mixture of 2,2,4- and/or 2,4,4-trimethylhexamethylenediamine.

The polyamides preferably have a relative viscosity (measured on a 1 wt. % solution in m-cresol or 1% (weight/volume) solution in 96 wt. % sulfuric acid at 25° C.) of from 2.0 to 5.0, particularly preferably from 2.5 to 4.0.

In particular preferred polyamides are e.g. Ultramid® grades such as Ultramid B24N 03 or Ultramid B27E commercially available from BASF SE, Germany.

The matrix polymer (I) of the afore-mentioned preferably comprises or consists of: 28 to 52 wt.-%, more preferred 35 to 45 wt.-%, most preferred 36 to 41 wt.-% polyamide (component I"), and 48 to 72 wt.-%, more preferred 55 to 65 wt.-%, most preferred 59 to 64 wt.-% ABS resin (component I'), wherein the sum of components (I') and (I") totals 100% by weight.

Such ABS resins with polyamide are commercially available as Terblend® N grades from Styrolution company (Frankfurt, Germany).

The matrix polymer (I) of the afore-mentioned blends of ABS resins with polyamide preferably comprises or consists of:

34 to 74 wt.-%, more preferred 55 to 72 wt.-%, most preferred 58 to 70 wt.-% polyamide (component I"), and 26 to 66 wt.-%, more preferred 28 to 45 wt.-%, most preferred 30 to 42 wt.-% ABS resin (component I'), wherein the sum of components (I') and (I") totals 100% by weight.

ABS resins with polycarbonate are commercially available as Novodur® Ultra grades from Styrolution company (Frankfurt, Germany).

The matrix polymer (I) of the afore-mentioned blends of ASA resins with polyamide preferably comprises or consists of:

28 to 52 wt.-%, more preferred 35 to 45 wt.-%, most preferred 36 to 41 wt.-% polyamide (component I"), and 48 to 72 wt.-%, more preferred 55 to 65 wt.-%, most preferred 59 to 64 wt.-% ASA resin (component I'), wherein the sum of components (I') and (I") totals 100% by weight.

ASA resins with polyamide are commercially available as Terblend S grades, e.g. Terblend S NM-31 from Styrolution company (Frankfurt, Germany).

The matrix polymer (I) of the afore-mentioned blends of ASA resins with polyamide preferably comprises or consists of:

34 to 74 wt.-%, more preferred 55 to 72 wt.-%, most preferred 58 to 70 wt.-% polyamide (component I"), and 26 to 66 wt.-%, more preferred 28 to 45 wt.-%, most preferred 30 to 42 wt.-% ASA resin (component I'), wherein the sum of components (I') and (I") totals 100% by weight.

ASA resins with polycarbonate are commercially available as Luran SC grades e.g. Luran S KR2864C from Styrolution company (Frankfurt, Germany).

Suitable elastomeric block copolymers used as styrenic polymer (I') for the inventive TCP resin composition are:

block copolymers of the structure $(S-(B/S))_n-S$, where S is a vinylaromatic—in particular styrene—block forming a hard phase, (B/S) is a random copolymer block of vinylaromatic monomer—in particular styrene—and of 1,3-diene—in particular 1,3-butadiene—forming a soft phase, and n are natural numbers from 1 to 10, preferably 1 to 4, wherein the elastomeric block copolymer has a monomer composition comprising 25 to 60% by weight of diene, in particular 1,3-butadiene, and 75 to 40% by weight of vinylaromatic compound, in particular styrene, the glass transition temperature Tg of block S is above 25° C. and that of block (B/S) is below 25° C., and the proportion of the hard phase in the elastomeric block copolymer is from 5 to 40% by weight and the relative amount of 1,2 linkages of the polydiene, based on the sum of 1,2- and 1,4-cis/trans-linkages, is less than 15%, preferably less than 12%.

Said block copolymers (I') are prepared by anionic polymerization in a nonpolar solvent, initiation being effected by means of organometallic compounds. Compounds of the alkali metals, in particular of lithium, are preferred. Examples of initiators are methyl-lithium, ethyllithium, propyllithium, n-butyllithium, sec-butyllithium and tert-butyllithium. The organometallic compound is added as a solution in a chemically inert hydrocarbon. The dose depends on the intended molecular weight of the polymer but is, as a rule, from 0.002 to 5 mol %, based on the monomers. Preferably used solvents are aliphatic hydrocarbons, such as cyclohexane and methylcyclohexane.

The random blocks of the block copolymers (I'), which blocks simultaneously contain vinylaromatic and diene, are prepared with the addition of a soluble potassium salt, in particular of a potassium alcoholate.

Preferred potassium alcoholates are tertiary alcoholates of at least 7 carbon atoms and typical corresponding alcohols are, for example, 3-ethyl-3-pentanol and 2,3-dimethyl-3-pentanol in particular Tetrahydrolinalool (3,7-dimethyl-3-octanol). In the case of alkyllithium-initiated polymerization in a nonpolar solvent such as cyclohexane, the molar ratio of lithium to potassium is from about 10:1 to 40:1.

The preparation of elastomeric block copolymers (I') is described in U.S. Pat. No. 6,197,889.

A preferred block copolymer (I') is one of the general formulae S-(B/S)-S, and a particularly preferred block copolymer is one whose soft phase is divided into blocks $(B/S)_1$-$(B/S)_2$; $(B/S)_1$-$(B/S)_2$-$(B/S)_1$; $(B/S)_1$-$(B/S)_2$-$(B/S)_3$; where the blocks have different compositions or their vinylaromatic/diene ratio in the individual blocks (B/S) changes in such a way that a composition gradient $(B/S)_{p1} << (B/S)_{p2} << (B/S)_{p3}$ . . . occurs in each segment (part-block), the glass transition temperature Tg of each part-block being less than 25° C. Such block copolymers which have within a block (B/S), for example, p repeating segments (part-blocks) with changing monomer composition can be formed by addition of p portions of the monomers, where p is an integer from 2 to 10.

A block copolymer which has a plurality of blocks (B/S) and/or S, each having a different molecular weight per molecule, is likewise preferred.

Preferred vinylaromatic compounds are styrene and furthermore alpha-methylstyrene and vinyltoluene and mixtures of these compounds. Suitable dienes are conjugated dienes preferably 1,3-butadiene and isoprene, and furthermore piperylene, 1-phenylbutadiene and mixtures of these compounds. A particularly preferred monomer combination comprises 1,3-butadiene (=butadiene) and styrene.

The (B/S) block is composed of, for example, 75 to 40% by weight of styrene and 25 to 60% by weight of butadiene. Particularly preferably, the (B/S) block has a butadiene content of from 35 to 70% and a styrene content of from 65 to 30%.

In the case of the monomer combination styrene/butadiene, the amount by weight of the diene in the total block copolymer is 15 to 65% by weight and that of the vinylaromatic component is accordingly 85 to 35% by weight. Butadiene/styrene block copolymers having a monomer composition comprising 25 to 60% by weight of diene and 75 to 40% by weight of vinylaromatic compound are particularly preferred.

The amount by weight of the soft phase composed of diene and vinylaromatic sequences—preferably 1,3-butadiene and styrene sequences—in the solid is 60 to 95%, preferably 70 to 90%, particularly preferably 80 to 90% by weight. The blocks S formed from the vinylaromatic monomers—in particular styrene—form the hard phase, the amount by weight accordingly accounts for 5 to 40, preferably 10 to 30, particularly preferably 10 to 20% by weight.

The amount by weight of the two phases can be measured by quantitative DSC (cyclic method yielding a stable, flat baseline) and solid state proton NMR relaxation (quantitative method to determine the different phases according to their softening temperature). the future phase ratio of a polymer can also be calculated from the amounts of monomers used if complete polymerization is permitted in each case and the different blocks can be assigned to phases.

The molecular weight of block S is in general from 1000 to 200,000, preferably from 3000 to 80,000, g/mol. Within a molecule, blocks S may have different molecular weights.

The molecular weight of the block (B/S) is usually from 2000 to 250,000, preferably from 5000 to 150,000, g/mol.

As in the case of a block S, a block (B/S), too, may have different molecular weights within a molecule.

Very particular preferred block copolymers (I') according to the present invention are linear styrene-butadiene block copolymers of the general structure S-(B/S)-S having, situated between the two styrene S blocks, one or more, preferably 1, 2 or 3, more preferred one (B/S)-random blocks having random styrene/butadiene distribution. The aforementioned linear styrene-butadiene block copolymers are commercially available as Styroflex® 2G 66 from Styrolution, Germany.

Component (II)

The thermally conductive filler material (II) used according to the invention consists of carbonyl iron powder (CIP) as electrically conductive and thermally conductive component (II-1) in combination with at least one component (II-2) selected from the group consisting of: multi wall carbon nanotubes, silicon carbide, diamond, graphite, aluminosilicate and boron nitride.

Preferred are inventive TCP resin compositions wherein the filler material (II) is a combination of carbon iron powder (II-1) with one of the afore-mentioned components (II-2). The volume ratio between components (II-1) and (II-2) is from 15:1 to 0.1:1, preferably 10:1 to 0.5:1, more preferred 7:1 to 1:1, most preferred 5:1 to 2:1.

The filler material (II) can comprise differently shaped particles such as spheres, flakes, rods etc.

According to one embodiment a combination of spherical particles with flakes and/or rod like structures is used as filler material (II).

Usually by increasing the filler content it is possible to lift up the thermal conductivity, often at expense of mechanical properties and surface quality. A large fraction of small particles of the filler material (II) can increase the viscosity of the TCP resin during processing. Very large particles can result in problems during injection molding.

It was surprisingly found, that the special mixing ratios of the filler materials (II-1) and (II-2), specific concentrations of filler materials (II) in the TCP resin and the specific particle size of the filler material (II) lead to an optimum for thermal conductivity, mechanical properties and surface quality.

Preferably, the average particle size (weight median diameter $D_{50}$) of the filler material (II) is less than 200 microns, and more preferred less than 100 microns; as measured using mesh analysis (e.g. Retsch AS 200 jet), Transmission Electron Microscopy (TEM), dynamic image analysis (e.g. Retsch Camsizer XT) or laser light scattering (e.g. Horiba LA-300).

Preferably, the average particle size ($D_{50}$) of the filler material (II) is from 0.1 to 100 µm, more preferred from 0.2 to 80 µm, most preferably from 1 to 50 µm.

Particles or granules which have multi-modal size distribution in their particle size can also be used.

Suitable carbonyl iron powders (II-1) are such having a high purity grade 97% Fe basis) and unique morphological properties. Said carbonyl iron powders are generally very fine and spherical having preferably an average particle size ($D_{50}$) of less than 25 microns, more preferred from 1 to 10 μm, most preferably from 2 to 7 μm. Preferred are carbonyl iron powders which are formed via thermal decomposition of liquid pentacarbonyl iron which are used as such or more preferred coated. A suitable and preferred coating is silicone dioxide ($SiO_2$).

Said CIPs are commercially available e.g. from BASF SE, Germany.

It was found that the filler material (II-2) in combination with the carbonyl iron powder (II-1) acts as a synergist leading to an increased thermal conductivity of the inventive TCP resin if the volume ratio of the components (II-1) and (II-2) is defined in accordance with the invention. The thermal conductivity of a synergistic mixture of component (II-1) and component (II-2) is higher than the thermal conductivity of a resin composition comprising the same volume content of component (II-1) alone.

When graphite is used as component (II-2), the graphite may be synthetically produced or naturally produced as far as it has flake shape. Naturally produced graphite is preferred.

There are three types of naturally produced graphite that are commercially available. They are flake graphite, amorphous graphite and crystal vein graphite as naturally produced graphite.

Flake graphite, as indicated by the name, has a flaky morphology. Amorphous graphite is not truly amorphous as its name suggests but is actually crystalline. Crystal vein graphite generally has a vein like appearance on its outer surface from which it derives its name.

Synthetic graphite can be produced from coke and/or pitch that are derived from petroleum or coal. Synthetic graphite is of higher purity than natural graphite, but not as crystalline.

Flake graphite and crystal vein graphite that are naturally produced are preferred in terms of thermal conductivity and dimension stability, and flake graphite is more preferred.

Especially preferred filler materials (II-2) are graphite flakes, in particular naturally produced graphite flakes, having a particle size of from about 5 to about 100 μm and preferably about 20 to about 80 μm. The purity of the graphite ranges from 80 to 99.9% carbon; high purities of more than 99.5% carbon are preferred.

Suitable natural graphite flakes are commercially available from Alfa Aesar GmbH & Co KG, Germany and Kropfmühl GmbH, Germany.

The multi-wall carbon nanotubes (MWCNT) used as filler material (II-2) have preferably an aspect (length to thickness) ratio of more than 100, more preferred the ratio is more than 120, most preferably about 150. The average thickness (diameter, determined by transmission electron microscopy (TEM)) of the MWNT is in the range of from 5 to 40 nm, preferably 5 to 15 nm, and the average length (determined by TEM) is in the range of from 1 to 25 μm, preferably 1 to 9.5 μm, more preferred 1 to 5 μm.

The purity of the MWCNT ranges from 80 to 95% carbon, purities of 90% carbon or more are preferred. Multiwall carbon nanotubes can be produced in multi-ton amounts via a chemical vapor deposition process using a special catalyst system. A production method for MWNT is described in EP-1 893 528 and the synthesis of a suitable catalyst system is given in U.S. Pat. No. 7,923,615.

Suitable MWNT filler materials (II-2) are commercially available from Nanocyl S. A., Belgium; Nanocyl® NC7000 being in particular preferable.

Suitable boron nitrides (BN) used as filler material (II-2) according to the invention include cubic boron nitride, hexagonal boron nitride, amorphous boron nitride, rhombohedral boron nitride, or another allotrope, as well as combinations comprising at least one of the foregoing. It may be used as powder, agglomerates, fibers, or the like, or a combination comprising at least one of the foregoing. Hexagonal boron nitride, in particular in form of platelets, is preferred.

Suitable boron nitride generally has an average particle size of 1 to 500 micrometers. Within this range boron nitride particles having sizes of greater than or equal to 3, specifically greater than or equal to 5 micrometers may be advantageously used. The average particle size ($D_{50}$) of the BN particle is preferably in the range of 3 to 200 micrometers, more preferred in the range of 5 to 100 micrometers, most preferred in the range of 5 to 50 micrometers. The particle size indicated here means the single BN particle or its agglomerate at any of their dimensions.

The boron nitride particles can exist in the form of agglomerates or as individual particles or as combinations of individual particles and agglomerates. Preferably the BN has a BN purity of greater than or equal to 95 wt.-%, specifically, greater than or equal to 99.8 wt.-%.

Suitable silicon carbides (SiC) used as filler material (II-2) according to the invention include are all polytropic forms of silicon carbide. A preferred form is black alpha-SiC (hexagonal structure) produced according to Acheson process. Preferably the SiC has a purity of 97.5 to 98.5% and contains not more than: 0.3% carbon, 0.8% silicon, 0.2% $Fe_2O_3$ and 1.3% $SiO_2$.

The average particle size ($D_{50}$) of the SiC particle is preferably in the range of 1 to 50 micrometers, more preferred in the range of 1 to 20 micrometers, most preferred in the range of 1 to 10 micrometers, in particular most preferred in the range of 1 to 5 micrometers. Suitable silicon carbides are commercially available from Mineralienhandel Bürgel, Germany.

When diamond is used as filler material (II-2), the diamond is usually used as a powder which may be naturally or synthetically produced. Usually an industrially produced monocrystalline or polycrystalline diamond powder, preferably a monocrystalline diamond powder is used. In monocrystalline diamond the slip plane is parallel to the optical axis (111 plane). Upon stress this structure breaks into blocks.

Synthetic diamonds are produced under high temperatures (>1500° C.) and high pressure (6 GPa) starting from graphite using metal catalysts (Fe, Ni). The average particle size ($D_{50}$) of the diamond particles is generally in the range of 0.1 to 50 micrometers, preferably in the range of 0.1 to 15 micrometers, more preferred in the range of 0.2 to 10 micrometers, most preferred in the range of 0.2 to 5 micrometers. Suitable diamond powders are commercially available from Schmitz Metallographie GmbH, Germany.

Aluminosilicates suitable as filler material (II-2) for the present invention are based on natural occurring aluminosilicates having preferably an average particle size from 3 to 100 μm, in particular 2 to 25 μm (D50: Mass-median-diameter (MMD), determined by a Cilas laser granulometer). Said aluminosilicates can be used without further treatment or the surface can be treated with a coupling agent, for the purpose of improving the interfacial bonding between the aluminosilicate surface and the matrix polymer (I). Examples of the coupling agent include such of the silane series, titanate series and zirconate series, preferably of the silane series, in particular preferred is methacrylsilane. The coupling agent is preferably added to the aluminosilicate before mixing the filler material (II) with the matrix polymer (I).

Aluminosilicates suitable as filler material (II-2) for the present invention are commercially available as Silatherm®, in particular Silatherm 1360-010, Silatherm 1360-400 and Silatherm 1360-400MST, from Quarzwerke Frechen.

Among the afore-mentioned filler materials (II-2) graphite and/or multi wall carbon nanotubes are preferred; in particular preferred is the use of graphite or multi wall carbon nanotubes. More preferred is a thermally conductive filler material (II) consisting of carbonyl iron powder (II-1) in combination with graphite or multi wall carbon nanotubes as filler material (II-2) wherein the volume ratio between components (II-1) and (II-2) is preferably 10:1 to 0.5:1, more preferred 7:1 to 1:1, most preferred 5:1 to 2:1.

Component (III)

Preferably, component (III) has either a wax/talcum-like appearance at normal conditions (20° C., 1013 mbar, no addition of solvents) and/or a molecular weight of not more than 5 kDa, in particular not more than 1 KDa. The component (III) may be any additive known for plastics in the art. These are exemplarily processing aids (e.g. emulsifiers, polymerization initiators, buffer substances, conventional dispersing agents, such as low-molecular-weight waxes, e.g. polyethylene waxes, or stearates, such as magnesium stearate or calcium stearate), a plasticizer, a glossing agent, an antioxidant, a metal deactivator, an antistatic agent, a flow agent, an anti-sticking agent, metal ions, fatty acids, pigments, dyes, flame retardant additives, and stabilizers, such as light stabilizer (e.g., an UV-absorber), a process stabilizer, or a radical scavenger, and a phenolic primary stabilizer.

Suitable antioxidants are sterically hindered mono- or polynuclear phenolic antioxidants, which may be substituted in various ways and also bridged via substituents. These include not only monomeric but also oligomeric compounds, which may be built up from more than one fundamental phenol unit. Hydroquinones and substituted compounds which are hydroquinone analogs are also suitable, as are antioxidants based on tocopherols and their derivatives. Mixtures of different antioxidants may also be used. In principle, it is possible to use any compound which is commercially available or suitable for styrene copolymers, such as Topanol® or Irganox®.

Alongside the phenolic antioxidants mentioned as examples above, it is possible to use costabilizers, in particular phosphorus- or sulfur-containing costabilizers. Such phosphorus- or sulfur containing costablizers are known to the person skilled in the art and are commercially available.

Examples of suitable antistats are amine derivatives, such as N,N-bis(hydroxyalkyl)-alkylamines or -alkyleneamines, polyethylene glycol esters, copolymers of ethylene glycol and propylene glycol, and glycerol mono- and distearates, and mixtures of these.

Pigments are composed of solid particles less than 100 µm, preferably less than 50 µm, more preferred less than 1 µm in diameter. Examples of pigments are titanium dioxide, zinc chromate, phthalocyanines, lithopone, ultramarine blue, iron oxides and carbon black, and the entire class of organic pigments.

Examples of flame retardants are the halogen-, sulfur or phosphorus-containing compounds and/or mixtures thereof known to the person skilled in the art, magnesium hydroxide and other customary compounds or mixtures of these. Red phosphorus is also suitable.

Dyes are all dyes which can be used for the transparent, semitransparent or nontransparent coloration of polymers, in particular those which are suitable for coloration of styrene based copolymers. Dyes of this type are known to the person skilled in the art.

Examples of suitable stabilizers to counter the action of light (UV-stabilizer) are various substituted resorcinols, salicylates, benzotriazoles, benzophenones and HALS (hindered amine light stabilizers), commercially available, for example, as Tinuvin®.

A component (III) as used herein may be added to the styrene copolymer composition on purpose or may result from the production process of either the polymer raw components and/or the blending process (e.g., as residual(s) from solvent(s), monomer(s), activator(s), precipitation and/or purification step(s), degradation products from monomer(s), activator(s) and/or other pyrolytic product(s)). The additive may be added upon blending the polymer raw components and/or may be comprised in one or more of the polymer raw component(s).

According to one preferred embodiment the inventive TCP resin composition comprises (or consists of) components (I) and (II) in the following amounts:

57 to 70%, more preferred 60 to 69% by volume of at least one of the afore-mentioned elastomeric block copolymers (I'), in particular one linear styrene-butadiene block copolymer of the general structure S-(B/S)-S having, situated between the two styrene S blocks, one (B/S)-random block having random styrene/butadiene distribution, as matrix polymer (I);

30 to 43%, more preferred 31 to 40% by volume of a thermally conductive filler material (II) consisting of carbonyl iron powder as component (II-1) in combination with at least one component (II-2) selected from the group consisting of: multi wall carbon nanotubes, silicon carbide, diamond, graphite, aluminosilicate and boron nitride, preferably graphite or multi wall carbon nanotubes;

wherein the volume ratio between components (II-1) and (II-2) is 10:1 to 0.5:1, more preferred 7:1 to 1:1, most preferred 5:1 to 2:1;

and wherein the sum of components (I) and (II) totals 100% by volume.

Preparation of TCP Resin Composition

Further subject of the invention is a process for the preparation of the TCP resin compositions by (i) melt-mixing of the matrix polymer (I) and, if present, optional components (Ill), and (ii) addition and homogeneous dispersion of the filler material B) to the melt.

The preparation of the TCP resin composition follows conventional procedure steps which are well known in the art.

The TCP resin compositions are in the form of a melt-mixed blend, wherein all of the polymeric components are well-dispersed within each other and all of the non-polymeric ingredients are homogeneously dispersed in and bound by the polymer matrix, such that the blend forms a unified whole. The blend may be obtained by combining the component materials using any melt-mixing method. The component materials may be mixed to homogeneity using a melt-mixer such as a single or twin-screw extruder, blender, kneader, Banbury mixer, etc. to give a resin composition. Part of the materials may be mixed in a melt-mixer, and the rest of the materials may then be added and further melt-mixed until homogeneous. The sequence of mixing in the manufacture of the TCP resin composition of this invention may be such that the matrix polymer (I) may be melted in one shot and the filler material (II) and optional components (III) may be fed from a side feeder, and the like, as will be understood by those skilled in the art.

Preferably, the components are extrusion blended or compounded in a high intensity blender such as a twin-screw extruder.

The obtained inventive TCP resin composition can be formed into shaped articles by a variety of means such as injection molding, extrusion, compression forming, vacuum forming, blow molding etc. well established in the art.

The inventive TCP resin composition can be advantageously used in a sheet extrusion process as well as for injection molding.

A further subject of the invention is a shaped article made from the inventive TCP resin composition.

Shaped articles comprising (or consisting of) the inventive TCP resin composition can be used for several applications such as: materials with antistatic finish, electrical and electronic housings, toys and helmet inlays.

A further subject of the invention is the use of said shaped articles for the afore-mentioned applications.

Compared to materials according to the prior art the inventive TCP resin composition shows a unique combination of properties, in particular less shrinkage, and a high gloss surface. Furthermore the inventive TCP resin composition shows significant improvements in terms of processability and is very suitable for injection molding.

The present invention is further described by the following examples and claims.

EXAMPLES

Materials:
Component (I):
Elastomeric block copolymer: Styroflex® 2G 66 from Styrolution (Frankfurt, Germany), a linear styrene-butadiene triblock copolymer (SBC) of the structure S-(S/B)-S, the amount of the monomers in the total block copolymer is 35% by weight of butadiene and 65% by weight of styrene; the weight ratio of the blocks is 16/68/16; MFI: 14 (200° C./5 kg) g/10 min.

Component (II):
Carbonyl Iron Powder (CIP): spherical particles 3.0 to 5.0 µm, coated with $SiO_2$, density: 7.8 g/cm$^3$ (source: BASF SE, Germany).

MWNT: Multiwall (Carbon) Nanotubes, average diameter 9.5 nm, average length 1.5 µm, density: 1.75 g/cm$^3$, purity: 90% carbon (source: Nanocyl S. A., NC 7000—MWCNT).

Graphite: natural occurring graphite flakes, up to 325 mesh, density: 2.26 g/cm$^3$, 99.8% purity (source: Alfa Aesar GmbH & Co KG, Germany).

Boron nitride (BN): Mixed platelets, agglomerates, $D_{50}$=16 µm, density: 2.2 g/cm$^3$ (Boron nitride CF600 from Momentive Performance Materials Inc., USA).

Diamond: Single crystalline powder, $D_{50}$=0.25 to 45 µm, density: 3.52 g/cm$^3$ (source: Schmitz-Metallographie GmbH, Germany).

Silicon carbide: black modification, $D_{50}$=3±0.5 µm, density: 3.2 g/cm$^3$ (source: Mineralienhandel Bürgel, Germany).

Aluminosilicate: Silatherm® Grade: 1360-400 MST (source: Quarzwerke Frechen), a natural occurring aluminosilicate treated with methacrylsilane, D50=5 µm (D10=1 µm, D90=16 µm), density: 3.65 g/cm$^3$ The TCP resin compositions were prepared by mixing and compounding matrix polymer (I) and filler material (II) with Haake Rheomix 600p (time: 30 min at 30 rpm, Temp. 220° C. for SBC, 240° C. for ABS, 250° C. Terblend N).

Samples from the obtained TCP resin compositions were prepared by hot pressing with a Carver compression molding machine 25-12-2HC.

Procedure for sample preparation for measurement of the thermal conductivity with Carver heated press 25-12-2HC Compound lumps of the TCP resin compositions obtained from the kneader Haake Rheomix 600p are placed in the middle of a sandwich consisting of a metal plate, a release foil (e.g. glass fabric enhanced PTFE), a metal spacer (1 mm thickness) for adjusting the thickness of the resultant sample, again a release foil and a metal plate.

This sandwich is preheated in the Carver heated press 25-12-2HC (220-250° C. depending on utilized polymer) without applied pressure for 2 min to 4 min (depending on the time needed for softening of the respective compound).

After the material has softened a pressure of 6 metric tons is applied to the sandwich for 1 min. Afterwards the sandwich is removed and placed in a water cooled press for re-cooling with an applied force of 8 kN. Finally a 1 mm thick sample piece is received for investigation of the thermal conductivity.

Procedure for Sample Preparation for Measurement of the Electrical Bulk Resistivity Compound lumps of the TCP resin compositions obtained from the kneader Haake Rheomix 600p were granulated. Afterwards the granulate material was processed with a DSM Xplore Micro Injection molder and a mold giving universal test specimen with 80 mm*10 mm*4 mm size. Therefore a melt temperature of 260° C., a mold temperature of 50° C. and an injection pressure of 16 bar for 22 s were applied.

Measurement Methods:
Thermal conductivity $\kappa = \alpha \cdot c_p \cdot \rho$:
thermal diffusivity α: determined by Laser flash analysis (XFA 500 XenonFlash apparatus (Linseis) with an InSb infrared detector) through-plane measurement, Temp. 25° C. under air
specific heat $c_p$ was determined by DSC (TA Instruments Q1000 DSC), 20 K/min, 50 ml/min N2, 10 to 30 mg sample, ASTM E1269
temperature program:
1. slope set to 200 to 215° C.
2. isotherm for 10 minutes
3. slope set to minus 40° C.
4. isotherm for 10 minutes
5. slope set to 200 to 215° C.
density ρ is determined by Buoyancy Balance (Mettler Toledo AG245)
electrical bulk resistivity was measured according to DIN EN ISO 3915
3 universal test specimens 80 mm×10 mm×4 mm per material
electrodes are applied at both sides of the test bar by silver paint
sample was preconditioned at 60° C. for 5 hrs, then stored for 16 hrs at 23 (+/−2) ° C. and 50 (+/−5) % relative humidity
application to sample holder, application of constant current (1 mA), potential measured on front and back side of the sample
distance between measurement electrodes (10 mm)
deviation from ISO standard: measurement was not orthogonal to injection direction, instead measurements of front and backside calculation formula for electrical resistivity: ρ=ΔU*A/(I*d)

Table 1 shows inventive TCP resin compositions with a filler material (II)—a mixture of CIP (II-1) and a further thermally conductive filler material (II-2)—in Styroflex 2G66 as matrix polymer (I). The sum of components (I) and (II) totals 100% by volume.

TABLE 1

Matrix (I): Styroflex 2G66, Filler material (II-1): CIP

| Exp. No. | total Additive (II) vol % | Volume Ratio (II-1)/(II-2) | Filler material (II-2) | Thermal diffusivity cm$^2$/s | Density g/cm$^3$ | Heat capacity J/g*K | Thermal conductivity W/m*K | Electrical Resistivity Ohm*m |
|---|---|---|---|---|---|---|---|---|
| Cp. Exp. 1 | 33.3 | — | — | 0.00208 | 3.33 | 0.693 | 0.481 | |
| 1 | 33.3 | 10:1 | MWNT | 0.00296 | 3.123 | 0.719 | 0.664 | |
| 2 | 33.3 | 5:1 | MWNT | 0.00351 | 3.002 | 0.699 | 0.736 | 2.00 |
| 3 | 33.3 | 10:1 | SiC | 0.00257 | 3.156 | 0.698 | 0.567 | |
| 4 | 33.3 | 10:1 | Graphite | 0.00255 | 3.123 | 0.67 | 0.533 | |
| 5 | 33.3 | 5:1 | Graphite | 0.00275 | 2.978 | 0.663 | 0.543 | |
| 6 | 33.3 | 2.5:1 | Graphite | 0.003523 | 2.7767 | 0.744 | 0.728 | |
| 7 | 33.3 | 5:1 | BN | 0.002955 | 2.9733 | 0.695 | 0.61 | |
| 8 | 33.3 | 3:1 | alumino-silicate | 0.00273 | 2.860 | 0.732 | 0.57 | |

The data in Table 1 show that the further thermally conductive filler component (II-2) acts synergistically with the CIP (I-1). All mixtures from Table 1 have the same total filler content; comparative example 1 contains no further thermally conductive filler component (II-2). By exchanging a defined portion of CIP with a further thermally conductive filler (II-2) the thermal conductivity of the resulting resin composition can be enhanced by 7 to 30%.

Mechanical Characterization

Larger amounts for mechanical characterization of mixture from example 8 have been produced with Coperion twin-screw extruder ZSK26Mcc (D=26 mm, L/D=44) using feed enhancement technology (FET) (melt temperature: 246° C., total throughput: 30 kg/h, melt pressure: 16 bar, screw speed: 350 1/min, temperature (zones 1 to 12): 220° C.).

Injection molding of dog bones (170 mm*10 mm*4 mm) and Charpy samples (80 mm*10 mm*3 mm) with Arburg 320 S Allrounder 500-150 (T(melt): 220° C.; T(mold): 50° C.).

notched Charpy impact strength was determined according to ISO 179/1eA (sample preparation with Circular Saw Mutronic Diadisc 6200 and V-notch saw blade)

un-notched Charpy impact strength was determined according to ISO 179/1eU

Impact pendulum Zwick/Roell RKP 5113 (50 J hammer)

Tensile test: E-modulus was determined according to DIN EN ISO 527 Test of tensile properties with Universal testing machine Zwick Z020 with macro displacement transducer (speed for tensile modulus: 1 mm/min; rest of test: 50 mm/min).

Flow curve and shrinkage evaluation
Instrument: Rheograph 6000 (Göttfert)
Measurement parameters: Temperature selected based on polymer:
Styroflex 2G66 (200° C.)
Procedure
a) Measurement of the flow curve. This gives the actual shear rate for the utilized dye geometry (30 mm length, 1 mm diameter) and the selected two piston speeds during the melt density measurements.

b) Measurement of the melt density:
The column of the capillary rheometer is filled with the respective material, compressed by the stamp followed by a temperature equilibration. Afterwards the material is extruded through the die with the respective piston speeds. During the extrusion several material samples extruded between different fill levels are collected. With the known extruded fill level height and the column diameter the extruded volume is known. Together with the weight of the extruded sample the density in the molten state under the respective actual shear in the column is received.

Calculation of Shrinkage: $$\text{Shrinkage}\left[\frac{\rho}{\mu}\right] = \frac{\text{density}(RT) - \text{density}(\text{melt})}{\text{density}(RT)} * 100\%$$

The Melt Volume Rate (MVR) was measured according to DIN EN ISO 1133-1:2012-03.

TABLE 2

Mechanical Properties and Shrinkage

| Exp. No. | Charpy notched [kJ/m$^2$] | Charpy un-notched [kJ/m$^2$] | Tensile modulus [MPa] | Shrinkage [%] | MVR (200/21.6) [ml/10 min] |
|---|---|---|---|---|---|
| 8 | 47.2 | no break | 135 | 2.9 | 27.70 |

Results:

From mechanical characterization in table 2 it becomes clear that according to the invention TCPs with high toughness are obtained; measurement of un-notched Charpy shows no break and notched Charpy yields a high value. In addition high melt flow and low shrinkage are very beneficial for injection molding applications.

The invention claimed is:
1. A thermally conductive polymer (TCP) resin composition comprising components (I) and (II):
50 to 75% by volume of at least one matrix polymer (I), comprising at least one styrenic polymer (I') selected from the group consisting of: ABS (acrylonitrile-butadiene-styrene) resins, ASA (acrylonitrile-styrene-acrylate) resins, and elastomeric block copolymers of the structure (S-(B/S))$_n$-S, where S is a vinylaromatic block forming a hard phase, (B/S) is a random copolymer block of vinylaromatic monomer and of a conjugated diene forming a soft phase, and n are natural numbers from 1 to 10, wherein the elastomeric block copolymer has a monomer composition comprising 25 to 60% by weight of diene and 75 to 40% by weight of vinylaromatic compound, the glass transition temperature Tg of block S is above 25° C. and that of block (B/S) is below 25° C., and the proportion of the hard phase in the elastomeric block copolymer is from 5 to 40% by weight and the relative amount of 1,2 linkages of the polydiene, based on the sum of 1,2- and 1,4-cis/trans-linkages, is less than 15%;

25 to 50% by volume of a thermally conductive filler material (II) having a weight median particle diameter (D$_{50}$) of from 0.1 to 200 μm, which consists of carbonyl iron powder as component (II-1) in mixture with at least one component (II-2) selected from the group consisting of: multi wall carbon nanotubes, silicon carbide, diamond, graphite, aluminosilicates and boron nitride;

wherein the volume ratio between components (II-1) and (II-2) is from 15:1 to 0.1:1;

and wherein the sum of components (I) and (II) totals 100% by volume.

2. The TCP resin composition according to claim 1, wherein the thermal conductivity κ is more than 0.5 W/m·K.

3. The TCP resin composition according to claim 1, wherein the matrix polymer (I) comprises at least one further thermoplastic polymer (I") selected from the group consisting of polycarbonates and polyamides.

4. The TCP resin composition according to claim 1, wherein the matrix polymer (I) is selected from the group consisting of: ABS resins, ASA resins, elastomeric block copolymers of the structure (A-(B/A))$_n$-A, blend of ABS resins with polycarbonate, blend of ABS resins with polyamide, blend of ASA resins with polycarbonate, and blend of ASA resins with polyamide.

5. The TCP resin composition according to claim 1, comprising 57 to 70%, preferably 60 to 69%, by volume of component (I) and 30 to 43%, preferably 31 to 40%, by volume of component (II).

6. The TCP resin composition according to claim 1, wherein the volume ratio between components (II-1) and (II-2) is from 10:1 to 0.5:1, preferably 7:1 to 1:1, more preferred 5:1 to 2:1.

7. The TCP resin composition according to claim 1, wherein component (II-2) is graphite or multi wall carbon nanotubes.

8. The TCP resin composition according to claim 1, wherein the matrix polymer (I) consists of an elastomeric linear styrene-butadiene block copolymer of the general structure S-(B/S)-S having, situated between the two styrene S blocks, one (B/S)-random block having random styrene/butadiene distribution.

9. A process for the preparation of the TCP resin composition according to claim 1 by (i) melt-mixing of the matrix polymer (I) and (ii) addition and homogeneous dispersion of the filler material B) to the melt.

10. A shaped article comprising the TCP resin composition according to claim 1 formed by injection molding, extrusion, compression forming, vacuum forming, or blow molding.

11. A method of using a shaped article according to claim 10 for materials with antistatic finish, electrical and electronic housings, toys, and helmet inlays.

* * * * *